Patented Feb. 13, 1951

2,541,350

UNITED STATES PATENT OFFICE 2,541,350

2,2-DICYANO-PROPANEDIOL-1,3

Harry Gilbert, Cuyahoga Falls, Ohio, assignor to The B. F. Goodrich Company, New York, N. Y., a corporation of New York No Drawing. Application November 18, 1949, Serial No. 128,249

3 Claims. (Cl. 260—465.6)

This invention relates to a new chemical compound, 2,2-dicyano-propanediol-1,3 and to a method of preparing the same.

The condensation of aqueous formaldehyde with malononitrile in the presence of a basic catalyst has been studied by various workers. Ostling reported (Öfversigt of Finska Ventenskaps-Societetens Förhandl, 57, Div. A, No. 11, 1–13, 1914–15) the obtainment from the condensation of a product melting at 206–207° C. which he thought was a polymer of vinylidene cyanide

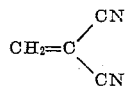

also called methylene malononitrile or 1,1-dicyano ethylene. Diels et al., however (Ber. 55, 3439, 1922, and Ber. 56, 2076, 1923), showed that the condensation as carried out by Ostling led to the formation of 1,1,3,3-tetracyanopropane (M. P. 137° C.) and 1,1,3,3,5,5-hexacyanopentane (M. P. 228°) and that no monomeric or polymeric vinylidene cyanide was secured. Consequently, the product melting at 206–207° C. obtained by Ostling was probably impure 1,1,3,3,5,5-hexacyanopentane.

Despite the inability to isolate monomeric vinylidene cyanide, Diels et al. postulated that it may have been an intermediate in the formation of 1,1,3,3-tetracyanopropane and 1,1,3,3,5,5-hexacyanopentane, as follows:

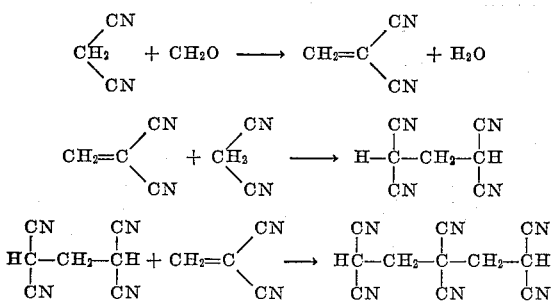

My investigations of the condensation of malononitrile with aqueous formaldehyde in presence of basic cataylsts have confirmed the work of Diels et al. as to the nature of the products obtained, that 1,1,3,3-tetracyanopropane and 1,1,3,3,5,5-hexacyanopentane; but the fact that monomeric vinylidene cyanide has now actually been prepared and found to polymerize spontaneously in presence of water (see U. S. Patent 2,476,270) completely invalidates the Diels et al. postulation as to the mechanism of the condensation.

In further investigating the condensation of malononitrile with formaldehyde, I have now prepared and isolated 2,2-dicyano-propanediol-1,3, a white crystaline compound melting and resinifying at 93 to 98° C. with evolution of formaldehyde. This compound has never been described in the literature or its existence postulated. Accordingly, it is the subject of the present invention.

The isolation of 2,2-dicyano-propanediol-1,3 also makes it possible to explain the condensation of malononitrile with formaldehyde to yield 1,1,3,-3-tetracyanopropane and 1,3,3,5,5-hexacyanopentane as proceeding according to the following mechanism involving the formation of methylol compounds as intermediates:

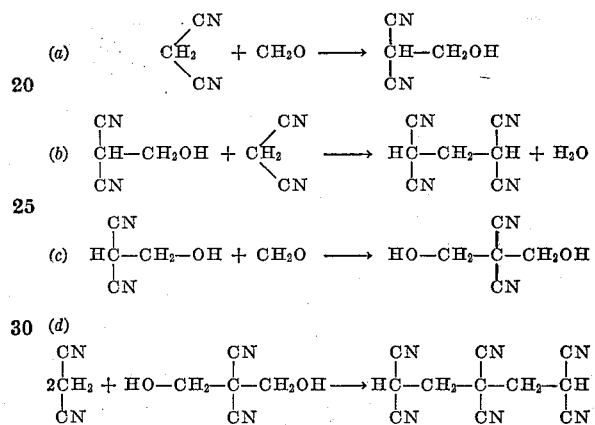

The dimethylol compound, 2,2-dicyano-propanediol-1,3 is prepared by reacting malononitrile with formaldehyde under anhydrous conditions, preferably in the presence of an organic solvent such as glacial acetic acid and a basic condensation catalyst such as potassium acetate. The temperature at which the reaction takes place is not critical proceeding slowly at temperatures as low as 0° C. and rapidly at temperatures as high as 100° C. Substantially equimolecular quantities of formaldehyde and malononitrile are preferably used since an excess of either reactant may lead to further condensation with the result that difficulties are encountered in isolating the 2,2-dicyano-propanediol-1,3.

The following example illustrates the preparation:

*Example*

Gaseous formaldehyde is bubbled into 40 grams of glacial acetic acid containing 0.25 gram of potassium acetate until 1.6 grams (0.0534 mole) of formaldehyde are absorbed. Malononitrile (3.6 g., 0.055 mole) is then added to the solution and the solution heated at 100° C. for 15 minutes. The reaction solution, which is water white, is cooled to room temperature and 20 ml. of benzene added whereupon a flocculent white precipitate is formed. The precipitate is filtered and recrystallized from 1:1 acetic acid benzene mixture to give 0.8 g. (24% of theory) of a white crystalline compound determined by analysis (per cent N calc. 22.2; found 22.2, 21.9) to be 2,2-dicyano-propanediol-1,3. It melts and resinifies at 93 to 98° C. with evolution of formaldehyde.

2,2-dicyano-propanediol is useful as an intermediate in the preparation of other compounds as has been indicated hereinabove. It reacts with malononitrile to yield 1,1,3,3-tetracyanopropane by the equation:

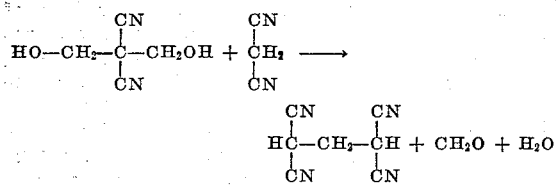

1,1,3,3,5,5-hexacyanopentane can also be secured from 2,2-dicyano-propanediol-1,3 and malononitrile by equation (d) hereinabove. 2,2-dicyano-propanediol is also useful in generating formaldehyde in situ since it evolves formaldehyde on application of heat. It is also useful in the formation of synthetic resins and as a fungicide, insecticide and bactericide.

I claim:
1. 2,2-dicyano-propanediol-1,3.
2. The method which comprises reacting substantially equimolecular quantities of formaldehyde and malononitrile under anhydrous conditions and separating the resulting 2,2-dicyano-propanediol-1,3 from the reaction mixture.
3. The method which comprises reacting substantially equimolecular quantities of formaldehyde and malononitrile in solution in glacial acetic acid and in the presence of potassium acetate, and separating the resulting 2,2-dicyano-propanediol-1,3.

HARRY GILBERT.

REFERENCES CITED

The following references are of record in the file of this patent:

UNITED STATES PATENTS

| Number | Name | Date |
| --- | --- | --- |
| 2,375,185 | Bergel et al. | May 8, 1945 |
| 2,386,586 | Brandt et al. | Oct. 9, 1945 |
| 2,476,270 | Ardis | July 19, 1949 |
| 2,478,990 | Walker | Aug. 16, 1949 |

OTHER REFERENCES

Beilstein (Handbuch, 4th ed.), vol. 3, 2d suppl.; p. 341 (1942).

Certificate of Correction

Patent No. 2,541,350　　　　　　　　　　　　　　February 13, 1951

HARRY GILBERT

It is hereby certified that error appears in the printed specification of the above numbered patent requiring correction as follows:

Column 1, line 49, after the word "that" insert *is*; column 2, line 13, for "1,3,3,5,5-hexacyanopen-" read *1,1,3,3,5,5-hexacyanopen-*; and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*